United States Patent [19]

Kulkarni

[11] Patent Number: 5,010,829
[45] Date of Patent: Apr. 30, 1991

[54] METHOD AND APPARATUS FOR TREATMENT OF HAZARDOUS WASTE IN ABSENCE OF OXYGEN

[76] Inventor: Prabhakar Kulkarni, 12027 Circle Dr. E., Houston, Tex. 77071

[21] Appl. No.: 471,551

[22] Filed: Jan. 29, 1990

Related U.S. Application Data

[63] Continuation-in-part of Ser. No. 244,318, Sep. 15, 1988, Pat. No. 4,896,614.

[51] Int. Cl.$^5$ .............................................. F23G 7/04
[52] U.S. Cl. ................................. 110/346; 110/250; 110/345; 422/186; 423/447.3
[58] Field of Search ............... 110/341, 346, 237, 238, 110/250, 345; 423/447.3; 422/186

[56] References Cited

U.S. PATENT DOCUMENTS

| | | | |
|---|---|---|---|
| 4,688,495 | 8/1987 | Galloway | 110/237 X |
| 4,886,001 | 12/1989 | Chang et al. | 110/250 X |
| 4,909,164 | 3/1990 | Shohet et al. | 110/346 |

*Primary Examiner*—Edward G. Favors
*Attorney, Agent, or Firm*—Gunn, Lee & Miller

[57] ABSTRACT

Hazardous waste treatment method and apparatus are disclosed in the preferred and illustrated embodiment. A feedstock of solid or liquid hazardous waste material is combusted in a plasma generator in the absence of oxygen and converted into non-hazardous components which are collected in a reactor chamber. The non-hazardous components are further converted into a gaseous outflow which is cooled and separated into selected constituents which are collected in storage vessels.

8 Claims, 2 Drawing Sheets

METHOD AND APPARATUS FOR TREATMENT OF HAZARDOUS WASTE IN ABSENCE OF OXYGEN

RELATED APPLICATIONS

This application is a continuation-in-part application of U.S. patent application Ser. No. 07/244,318 filed Sept. 15, 1988, now U.S. Pat. No. 4,896,614 issued on Jan. 30, 1990.

BACKGROUND OF THE DISCLOSURE

This invention relates to the destruction of hazardous waste materials, particularly, to a method and apparatus for conversion of hazardous waste material into useful by-products.

The safe disposal of hazardous waste materials is a high priority for both private industry and governmental agencies. A superfund has been established by the government to clean up areas of hazardous waste which present eminent danger to the public health and welfare. Thousands of regulations have been promulgated by the government to insure the safe use and disposal of hazardous materials. Use of some hazardous materials has been banned or extremely restricted. Due to the severity of the problem, various methods have been utilized for disposing of hazardous materials. Research continues in an effort to develop a method for the destruction of hazardous material which is also environmentally safe.

Various methods have been attempted for the disposal of hazardous material, including the use of electric plasma arcs to destroy toxic waste. Plasma generators are known in the prior art. A plasma arc generated by a plasma gun develops an extremely hot temperature zone having temperatures in the range of 10,000° F. to 30,000° F., or above. At such high temperatures, almost all organic and inorganic compounds may be converted into useful by-products.

U.S. Pat. No. 4,644,877 discloses a method and apparatus for the pyroelectric destruction of toxic or hazardous waste materials. The waste materials are fed into a plasma arc burner where they are atomized and ionized, and then discharged into a reaction chamber to be cooled and recombined into product gas and particulate matter. The recombined products are quenched using a spray ring attached to the reaction vessel. An alkaline atomized spray produced by the spray ring neutralizes the recombined products and wets the particulate matter. The product gases are then extracted from the recombining of products using a scrubber, and the product gases are then burned or used for fuel.

U.S. Pat. No. 4,479,443 discloses a method and apparatus for thermal decomposition of stable compounds. High temperatures necessary for decomposition are generated by a plasma generator. U.S. Pat. Nos. 4,438,706 and 4,509,434 disclose a procedure and equipment for destroying waste material. The material is decomposed in a plasma state in the presence of an oxidizing agent so that the waste material is converted into stable combustion products.

U.S. Pat. No. 4,615,285 discloses a method of destroying hazardous waste by means of under-stoichiometric incineration at a temperature of at least 1,200° C. The ratio between injected waste material and oxidant is regulated to give a quotient $CO_2/(CO \times CO_2)$ of less than 0.1.

U.S. Pat. Nos. 4,602,991 and 4,729,891, by the Applicant herein disclose a coal liquefaction process and hydrogen generating method, respectively, wherein the feed stock is heated in an inductive furnace under vacuum conditions.

As is noted above, various methods have been tried for disposing of hazardous waste material. Until the present invention, however, a commercially viable process which combines vacuum, induction and plasma technology for conversion of hazardous materials into useful by-products has not been available.

SUMMARY OF THE INVENTION

The present invention is directed to a method of destroying hazardous waste material, both liquid and solid waste material. The method comprises the steps of converting the hazardous material by exposing it to at least one high temperature plasma arc in the absence of oxygen. The converted gases and any non-gaseous constituents are collected in a depressurized reactor chamber which is devoid of oxygen. Solid waste material is directed through two reaction chambers. The collected gases are then directed through a series of chillers, compressors and molecular sieves for separation of the gases into individual components. The separated components are collected in storage vessels. None of the by-products of the process of the invention are released into the atmosphere.

DETAILED DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
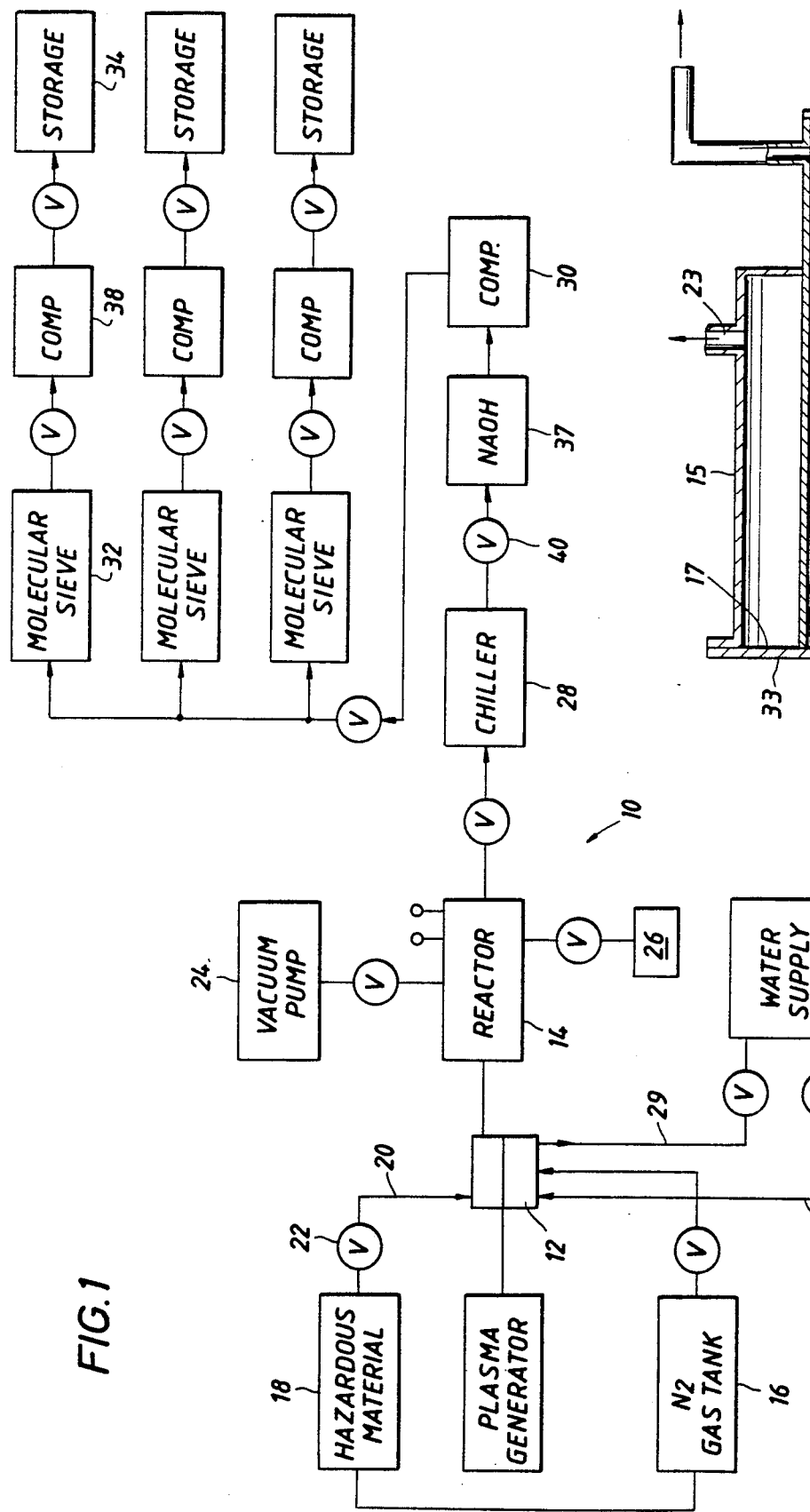
FIG. 1 is a schematic flow diagram of a method of treating hazardous waste material in the absence of oxygen.

Referring first to FIG. 1, the system of the invention for treatment of hazardous waste material is generally identified by the reference numeral 10. The system 10 includes a plasma generator 11 and plasma gun 12 connected to a reactor chamber 14. The plasma gun 12 is of a type commercially available. The plasma gun 12 is connected to a power supply which delivers power to operate the plasma gun 12. The plasma arc generated by the plasma gun 12 is sustained by nitrogen or argon gas which is supplied to the plasma gun 12 from a gas supply 16. Hydrogen may also be supplied to aid the conversion of waste material containing oxygen. The hydrogen will combine with the oxygen to form water. The plasma arc generated by the plasma gun 12 is a high temperature plasma sustaining plasma temperatures in the range of 10,000° F. to 30,000° F., or higher. At such high temperatures, almost all organic and inorganic compounds are split into individual components. While in the preferred embodiment, a plasma gun 12 generates the required temperatures for converting the waste material, it is understood that sufficiently high temperatures for accomplishing the conversion may be developed by other means, such as lasers or induction heating. The conversion of hazardous material may be accomplished at a temperature of 1,200° F. or above.

A source or feedstock of hazardous material 18 is connected to the plasma gun 12 via a feed line 20. The hazardous material is transported to the plasma gun 12 in a flowing slurry of liquid material through the feed line 20. Alternatively, a screw conveyer may be used to transport solid material to the inlet of the plasma gun 12. In the preferred embodiment, the hazardous material is fed to the plasma gun 12 through the feed line 20 at a predetermined rate of approximately three to six gallons per minute. If desired, the hazardous material may be fed to the plasma gun 12 at higher rates. For example, solid waste may be fed at a rate of up to two tons per hour or more. A valve 22 connects the feed line 20 to the hazardous material 18. The valve 22 may be opened or closed to increase or decrease the flow rate of hazardous material transported through the feed line 20.

Figure 2:
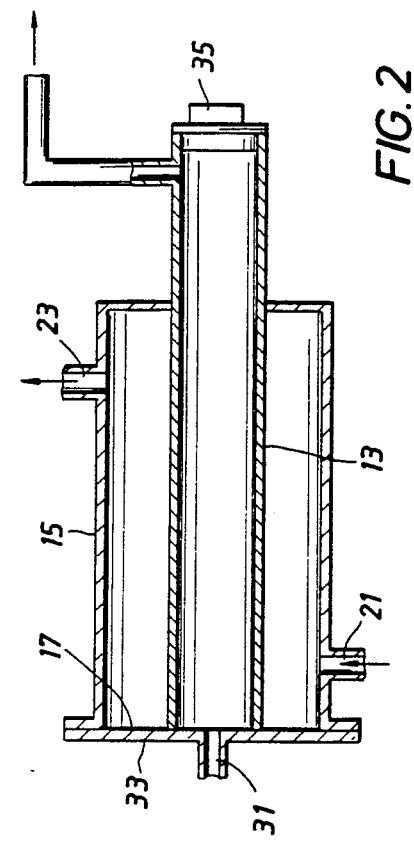
FIG. 2 is a partial sectional view of the plasma generator of the invention.

A partial sectional view of the plasma gun 12 is shown in FIG. 2. Due to the extremely high temperatures generated by the plasma gun 12, a water bath is used to cool the plasma gun 12. The barrel of the plasma gun 12 comprises an inner tube 13 concentrically positioned within an outer tube 15. The inner tube 13 is approximately seven feet eight inches in length and projects outwardly from the end of the outer tube 15 which is approximately six feet in length. Flange support members 17 are mounted about the inner tube 13 and secured to the ends of the outer tube 15. The support members 17 position the inner tube 13 concentrically within the outer tube 15 and close off the annular space 19 defined therebetween. Water is circulated in the annular space 19 for forming a cooling bath about the inner tube 13. Water is directed into the annular space 19 though a water inlet 21 and exits through a water outlet 23. Water is pumped to the plasma gun 12 from a water source 25 though a water line 27 and returned to the water source 25 through a return line 29 so that continuous water circulation is provided to maintain the plasma gun 12 at a relatively cool temperature.

The forward end of the inner tube 13 is provided with an opening 31. The plasma generator control head 33 is connected to the forward end of the inner tube 13. The electrodes of the plasma generator extend through the opening 31 so that the plasma arc is generated within the inner tube 13. The rear end of the inner tube 13 is closed by a removable plug 35. The plug 35 may be removed permitting inspection of the inner tube 13 for pitting or damage from heat or chemical reaction.

The hazardous waste material is incinerated within the inner tube 13. The waste material is delivered to the inner tube 13 via the line 20 which is connected to the plasma generator control head. The plasma gun 12 is connected to the reactor chamber 14 in a suitable manner. The reactor chamber 14 is maintained under vacuum conditions in the range of $10^{-1}$ to $10^{-3}$ torr or any lower attainable vacuum, thereby substantially removing all air from the reactor chamber 14. The reactor chamber 14 is evacuated by vacuum pumps 24 connected thereto. A sample container 26 is connected to the reactor chamber 14 for collecting a sample of the gases collected in the reactor chamber 14. The sample of gases is analyzed to insure that the hazardous material has been completely converted to harmless by-products.

From the reactor chamber 14, the collected gases are directed through a chiller 28 for rapidly cooling the gases and then through a NaOH solution tower 37 for converting any hydrochloric acid gases into sodium chloride (NaCl). A compressor 30 is connected to the outlet end of the NaOH tower 37 for pressurizing and directing the collected gases through a series of molecular sieves to remove undesirable impurities in the constituents forming the gas flow from the reactor chamber 14. The gas flow is separated into its individual constituents which are stored in storage vessels 34. Compressors 38 are connected between the molecular sieves 32 and storage vessels 34 for pressurizing the constituents of the gas flow into the storage vessels 34.

As an example, but in no way limiting the scope of the present disclosure, the individual constituents or by-products of the conversion of hazardous materials include nitrogen, hydrogen, carbon dioxide, methane and any silicate, metallic or any other solid constituents that are not converted into a gaseous by-products. The gaseous constituents are separated by passing the gases through the molecular sieves 32 and collecting the individual constituents in the storage vessels 34. The non-gaseous constituents are collected in the reactor 14 and removed upon completion of the conversion process. The reactor 14 includes an internal screw conveyor or the like for expelling any non-gaseous constituents collected in the reactor 14. The hazardous material is thereby converted into harmless by-products which are captured in the storage vessels 34. The process of the present invention is totally environmentally safe as no emissions are released into the atmosphere.

Referring again to FIG. 1, in operation the system 10 is initially pressurized and visually inspected for leaks and pressure drops. Pressures of 50 psi to 80 psi are maintained for a period of time to insure that the system does not leak. After checking that the vacuum pumps 24 are operating properly, the vacuum valves are opened and a vacuum is pulled throughout the system and isolated between closed valves 22 and 40 insuring that all oxygen in the system between the closed valves 22 and 40 is removed. Upon obtaining a vacuum of a minimum of $10^{-1}$ torr, the plasma gun 12 is activated. The valve 22 is then opened permitting the hazardous material to be delivered to the plasma gun 12. Initially, the pressure in the hazardous material tank is approximately 50 psi. When the pressure has dropped to 5 psi or less, the hazardous material tank 18 is empty and the valve 22 is shut off. The hazardous material is converted in the plasma arc formed by the plasma generator within the inner tube 13 of the plasma gun 12. The converted gases are collected in the reactor chamber 14. During the conversion of the hazardous material, the pressure in the system 10 increases. The valve 40 however is maintained in the closed position until the system pressure reaches the level of approximately 15 psi. Prior to opening the valve 40, a sample of the converted gases is collected in the sample container 26. The sample container 26 is double valved to separate it from the system 10. The sample of gases is then analyzed to determine whether the hazardous materials have been destroyed. If any traces of hazardous material remains in the sample, the gases are collected and passed through the plasma generator a second time.

Figure 3:
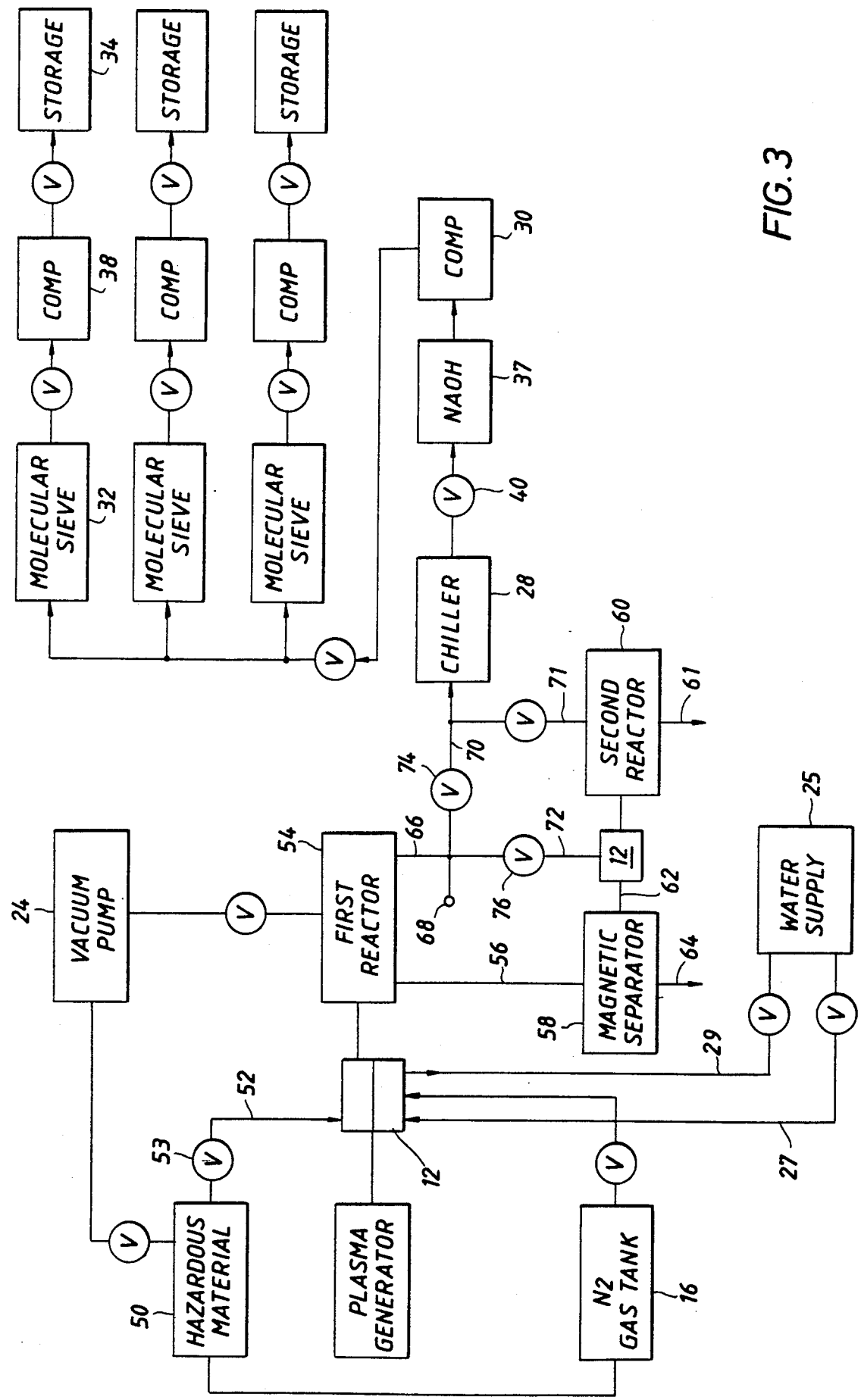
FIG. 3 is a schematic flow diagram of a method of treating solid hazardous waste material in the absence of oxygen.

Referring now to FIG. 3, a configuration of the system 10 is shown for treatment of solid hazardous material. The system is substantially the same as shown in FIG. 1 and therefore like reference numerals have been used to identify like components. As shown in FIG. 3, the solid waste material is collected in a collection vessel 50. The solid waste material, for example, tires or the like, is fed to the plasma guns 12 through a feedline or conduit 52 at a predetermined rate of up to two tons per hour or more upon opening a valve 53. A screw conveyor or the like transports the solid hazardous waste material from the collection vessel 50 to the plasma guns 12 via the conduit 52. The plasma guns 12 may be connected in series or may be spaced around a plenum which, when energized, will form a concentrated hot zone through which the solid waste material will flow and be collected in the reactor 54. As was discussed above in relation to the system shown in FIG. 1, a vacuum is pulled by the vacuum pumps 24 insuring that all oxygen in the system shown in FIG. 3 is removed. Once the proper vacuum is achieved, the plasma guns 12 are activated and solid waste material is flowed through the hot zone created by the plasma guns.

As the solid waste material passes through the hot zone, it is converted into non-hazardous components and collected in the reactor 54. At this stage of the process, the collection vessel 54 includes carbon black and disassociated gaseous components of the solid waste material in a non-hazardous states. Also, depending on the composition of the solid waste material passed through the hot zone created by the plasma guns 12, some solids such as metals, cans, or the like may be collected in the reactor 54. While the plasma guns 12 create an extremely hot zone, not all components of the solid waste material stream will be converted into a gaseous effluent. Complete conversion of the solid waste material into a gaseous state is dependent upon the volume and flow rate of solid waste material passing through the temperature zone created by the plasma guns 12.

The carbon black and nonconverted solid components of the hazardous material are collected in the bottom of the reactor 14 and transported via a screw conveyor or the like through line 56 to a magnetic separator 58. In the magnetic separator 58 the carbon black is separated from the metal solids and transported to the reactor 60 via a line 62. The solid metal material such as cans, are released from the magnetic separator through a discharge line 64 to a storage vessel for subsequent recycling or other use.

The disassociated non-hazardous gaseous components of the solid waste material are removed from the reactor 54 via a line 66. A volatile organic compound analyzer 68 is incorporated in the line 66 for analyzing the gas stream discharge from the reactor 54. The gas stream may be discharged directly to the chillers 28 via the line 70 or directed to the reactor 60 via the line 72. Valves 74 and 76 are incorporated in the lines 70 and 72, respectively, for directing the gas stream along the selected path.

Lines 62 and 72 join at the inlet of the vessel 60. The carbon black and gas stream from lines 62 and 72 pass through a second hot zone formed by a plasma gun 12 mounted at the inlet of the reactor 60. The gases and carbon black collected in the reactor 54 are passed through a second high temperature zone to insure that hazardous components in the solid waste material are completely converted into individual non-hazardous by products such as nitrogen, hydrogen, and carbon dioxide which are directed to the chillers 28 via line 71 and subsequently collected in the storage vessels 34 in the manner described above in relation to FIG. 1. The reactor 60 includes an internal screw conveyor or the like for expelling the carbon black collected at the bottom thereof via outlet conduit 61 into storage tanks for subsequent use.

When handling hazardous materials, certain steps must be taken to prevent hazards or mishaps from occurring. In the system 10, all components are fabricated of stainless steel material. The system is completely vacuumed as discussed above and all valves used are vacuum valves. In the event of a malfunction, solenoid valves are connected to an emergency shut off on the plasma generator and are utilized to stop the flow of hazardous material. Two manual valves are also incorporated in the system to shut off the flow of hazardous material in case of electrical failure or the like. Pressure gauges 36 monitor the pressure in the system and high temperature gaskets are used at the connections of various components forming the system. A thermal couple 38 is also incorporated in the system for reading or monitoring temperatures of the gases in the system. All exposed pipe of the system is sprayed with water for maintaining it a relatively low temperature.

While the foregoing is directed to the preferred embodiment of the present invention, other and further embodiments of the invention may be devised without departing from the basic scope thereof, and the scope thereof is determined by the claims which follow.

What is claimed is:

1. A method of converting solid hazardous waste material into useful by-products, comprising the steps of:
    (a) introducing the solid waste material into a first high temperature zone generated by at least one plasma gun and converting the waste material into a mixture of carbon black, gases and metallic nonconverted material;
    (b) collecting said mixture in a first reactor chamber in the absence of oxygen for preventing the recombination of said mixture with oxygen;
    (c) discharging the carbon black and metallic nonconverted material into a magnetic separator for separating the metallic material from the carbon black and collecting said metallic material for subsequent use;
    (d) directing said carbon black through a second high temperature zone into a second reactor chamber for further separation and conversion of hazardous constituents into non-hazardous gases;
    (e) directing the gases from said first and second reactor chambers through cooling apparatus for reducing the temperature of said gases;
    (f) passing said gases through molecular sieve apparatus permitting selected constituents of said gases to pass through said molecular sieve apparatus; and
    (f) collecting said selected constituents in storage vessels.

2. The method of claim 1 including the step of forming a vacuum of at least $10^{-1}$ torr for removing substantially all the oxygen from the reactor chambers.

3. The method of claim 2 including the step of collecting and analyzing a sample of the gases exiting said first reactor chamber.

4. The method of claim 3 including the step of circulating water about the plasma gun for maintaining a continuous cooling bath about the plasma gun.

5. The method of claim 1 wherein said carbon black is removed from said second reactor chamber and stored for subsequent use.

6. The method of claim 1 wherein said gases from said first reactor chamber are combined with said carbon black and directed through said second temperature zone.

7. The method of claim 1 wherein said first temperature zone is created by a plurality of plasma guns connected in series.

8. The method of claim 1 wherein said first temperature zone is created by a plurality of plasma guns spaced about a plenum.

* * * * *